Nov. 14, 1961 T. E. ABRAHAM 3,008,674
AIRCRAFT IN-FLIGHT REFUELING APPARATUS
Filed March 3, 1958 3 Sheets-Sheet 1
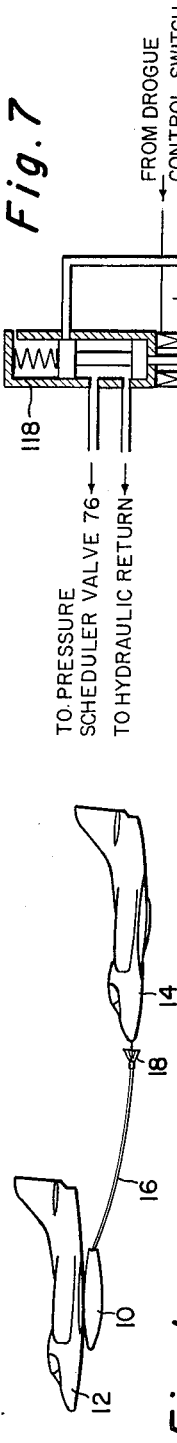
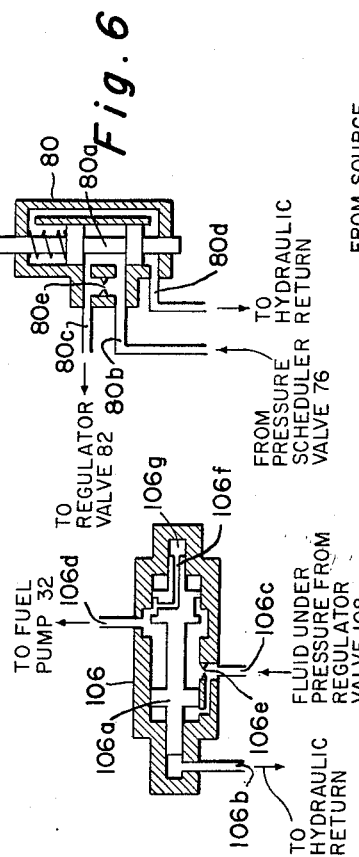
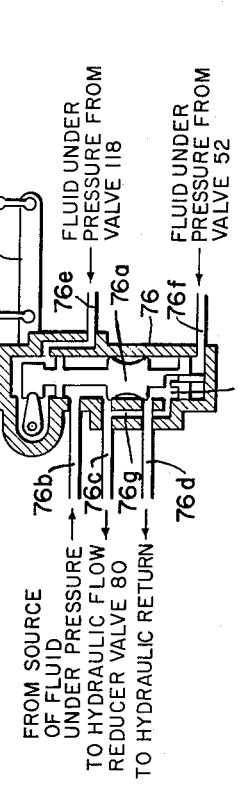
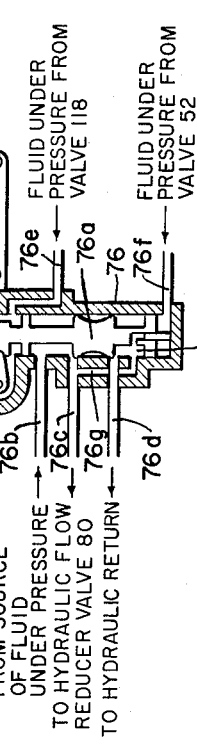
INVENTOR.
THOMAS E. ABRAHAM Nov. 14, 1961     T. E. ABRAHAM     3,008,674
AIRCRAFT IN-FLIGHT REFUELING APPARATUS
Filed March 3, 1958     3 Sheets-Sheet 2
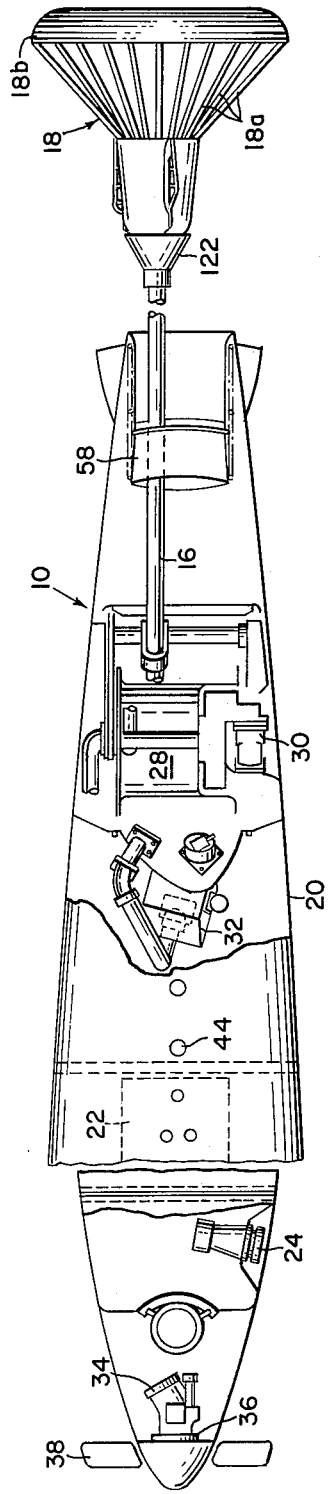
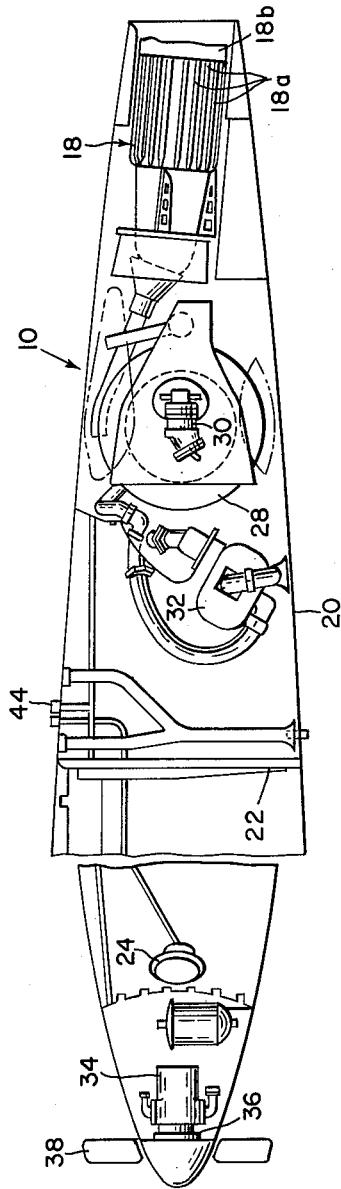
INVENTOR.
THOMAS E. ABRAHAM

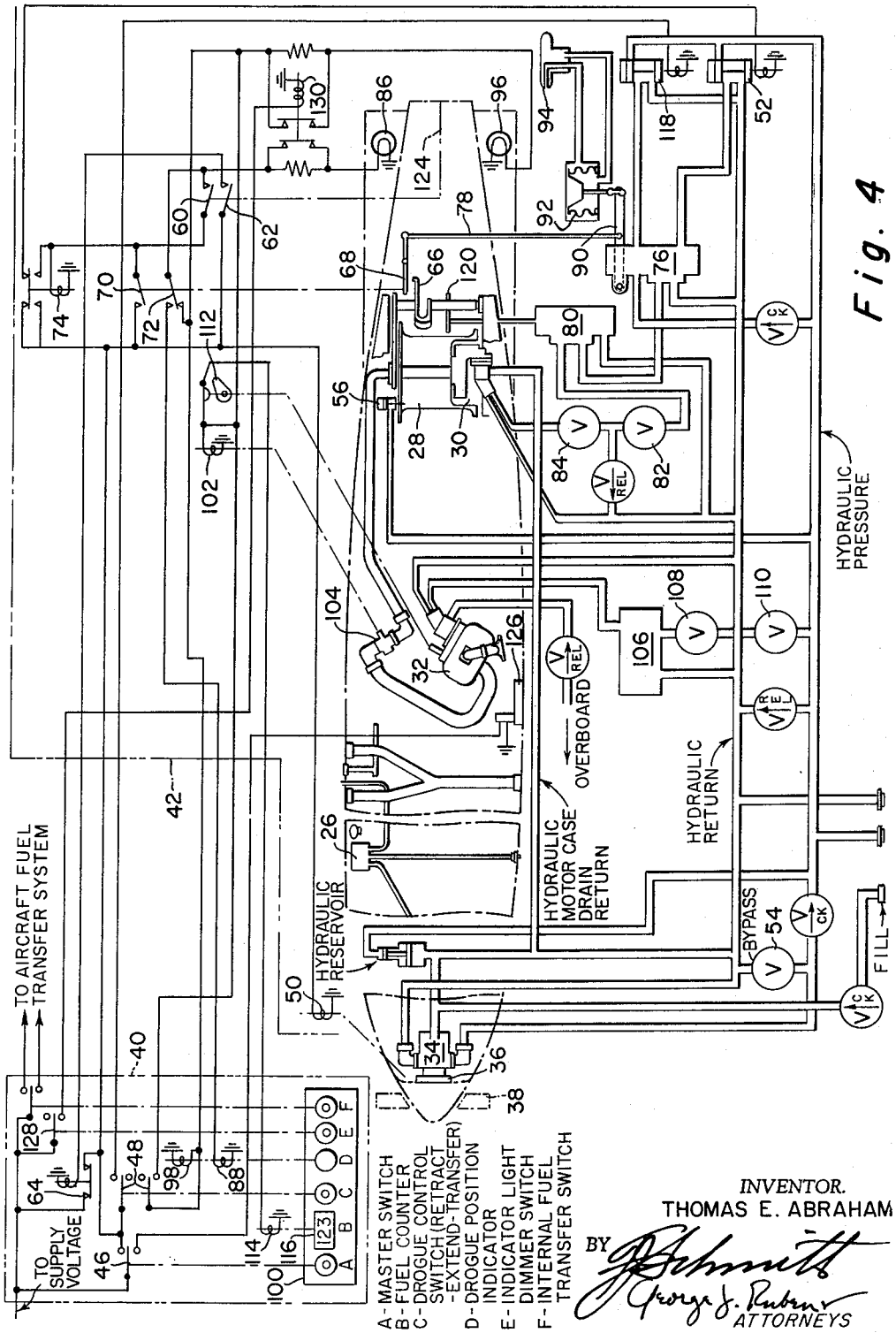

United States Patent Office 3,008,674
Patented Nov. 14, 1961

3,008,674
AIRCRAFT IN-FLIGHT REFUELING APPARATUS
Thomas E. Abraham, Palos Verdes Estates, Calif., assignor, by mesne assignments, to the United States of America as represented by the Secretary of the Navy
Filed Mar. 3, 1958, Ser. No. 718,929
4 Claims. (Cl. 244—135)

The present invention relates to a self-contained refueling unit adapted to quickly and easily convert a conventionally-equipped aircraft into an aerial tanker.

The invention is particularly useful in extending the combat range and safety margin of attack and fighter planes by enabling one of two companion craft to refuel the other at an intermediate point in its mission, with the refueling craft then returning to its base. The invention device is also of value in emergency situations where conventional tanker planes are not available for refueling purposes. A feature of the invention is that aircraft which have been so converted may be restored to combat status by the simple expedient of detaching an externally-carried refueling unit. This is of particular importance when the aircraft are carrier-based, since one of the major problems in this field has been to find means for increasing the refueling capabilities of naval vessels without reducing the number of combat craft aboard carriers, or destroying the effectiveness of the aircraft by requiring them to carry all or any part of the refueling apparatus at times when their speed and maneuverability must be at a maximum.

The refueling unit of the present disclosure is made up, in a preferred embodiment, of a torpedo-shaped housing containing a fuel tank, a flexible hose on a reel, a pump for transferring fuel from the tank through the hose, and a collapsible drogue secured to the outer end of the hose and normally stowed within the housing. In addition, the refueling unit (which is preferably carried under the fuselage of an aircraft so that it can be jettisoned in an emergency) incorporates a propeller-driven turbine for developing a source of fluid under pressure to operate the fuel pump, and a bidirectional hydraulic motor which is connected to the hose reel and adapted to retract the drogue following the operation by which fuel is transferred to a receiving aircraft. The provision of the ram air propeller-driven turbine makes the unit of a self-sufficient nature, no reliance whatever being placed upon the "mother" aircraft for primary power to perform the various steps of a complete fuel-transferring cycle.

An important feature of the system herein set forth is that the hydraulically-driven motor which is connected to the hose reel has two distinct operating functions—that is, it not only serves to retract the drogue into the housing following a fuel-transferring operation, but it is effective as well during the drogue-extending period to limit the rate at which such extension occurs. This is an important factor, as the drogue herein described is opened somewhat in the fashion of a parachute, and hence the extreme air pressure developed thereon could result in a too-rapid playing out of the hose unless such rate is limited by some form of governing means.

One object of the present invention, therefore, is to provide a self-contained refueling unit designed for detachable mounting under the fuselage of an aircraft, thus converting the latter into an aerial tanker.

Another object of the invention is to provide a refueling unit which is powered independently of the carrying aircraft.

A further object of the invention is to provide a refueling unit of the type described, incorporating a hose reel driven by a hydraulic motor, the latter performing its normal function as a motor during the hose-retracting operation, and in addition acting as a brake during the hose-extending, or streaming, period to limit the rate at which such extension occurs.

A still further object of the invention is to provide a refueling unit of the type described in which the hydraulic motor driving the hose reel acts as a brake to limit the speed of extension of a pressure-responsive drogue, the pressure applied to the hydraulic motor being varied in accordance with variations in air speed so as to take up any slack which may be produced in the hose during engagement between the supply aircraft and the receiver aircraft over a wide operating flight speed range.

Other objects and many of the attendant advantages of this invention will be readily appreciated as the same becomes better understood by reference to the following detailed description when considered in connection with the accompanying drawings wherein:

FIG. 1 is a view of a preferred form of refueling unit constructed in accordance with the teaching of the present invention, the unit being illustrated in condition to transfer fuel from the aircraft on which the unit is carried to a receiver plane;

FIG. 2 is a plan view of a refueling unit such as shown in FIG. 1, partly broken away to show the inner construction thereof, and with the drogue in extended position;

FIG. 3 is a side view of FIG. 2 with the drogue fully retracted;

FIG. 4 is a fluid flow chart and electrical wiring diagram explaining the operation of a self-contained refueling unit designed in accordance with the showings of FIGS. 1 through 3; and FIGS. 5 through 8 are detailed views of ceratin of the fluid-control valves of FIGS. 4.

Referring first to FIG. 1, there is shown a self-contained refueling unit designed in accordance with the principles of the present invention and identified by reference numeral 10. The refueling unit 10 is suspended from the fuselage of an aircraft 12 in such manner that it may be readily detached by the aircraft pilot through operation of any conventional releasing mechanism. The details of the supporting structure will not be described herein, since many devices are available for positioning a body below the fuselage of an aircraft in such a manner that it may be quickly and easily removed, reattached, or even jettisoned should an emergency arise during flight.

The unit 10 is adapted to supply fuel to a receiver aircraft 14 through a flexible hose 16 and a drogue 18, thus converting the aircraft 12 into a tanker during the refueling operation. Although hose 16 and drogue 18 are shown in the extended position, they are normally retracted within the body of the unit 10. This is made possible by a design for drogue 18 which incorporates a plurality of ribs 18a extending generally rearwardly and secured at their inner ends to the drogue body. The outer ends of the ribs are respectively attached to a tubular rim 18b of some pliable material such as fabric. When the drogue is in stowed condition, its ribs are collapsed into substantially parallel alignment as shown by FIG. 3. Upon ejection of the drogue into the air stream, the pliable rim is inflated, thereby causing the ribs to assume the generally frusto-conical shape illustrated in FIG. 2. This greatly facilitates proper engagement between drogue 18 and the receiver aircraft 14. As the details of such a collapsible drogue form no part of the present invention, they will not be discussed further. Reference is made to United States Patent No. 2,823,881 issued February 18, 1958, to Richard F. Patterson wherein such a device is described and claimed.

Referring now to FIGS. 2 through 4, there is shown a preferred form of construction for the refueling unit of FIG. 1, a portion of its skin being broken away to more clearly bring out the operational features. For example, FIG. 3, which illustrates a side view of the refueling unit 10, includes within the torpedo-shaped body 20 a fuel tank 22 having a pressure fuel intake connection 24 with a built-in shutoff valve. A combination level control and float-operated vent shutoff valve 26 (FIG. 4) of the float type, is connected to the pressure fuel intake 24 shown in FIGS. 2 and 3.

During a refueling operation, fuel is conveyed to the receiver aircraft 14 through the flexible hose 16 while the latter is in the extended position illustrated in both FIGS. 1 and 2. The hose 16, as shown, is carried on a reel 28 driven by a variable-speed hydraulic motor 30 of the positive-displacement type. Selective operation of motor 30 results in hose 16 being wound upon, or played out from, the reel 28 in a manner to be hereinafter described. The inner end of hose 16 is connected through a pump 32 of the positive-displacement type to the fuel tank 22, so that operation of this pump transfers fuel under pressure through the hose 16 to the receiver aircraft 14.

To provide power for operating both the fuel pump 32 and the hydraulic reel motor 30, unit 10 incorporates a further pump 34 connected to a ram-air turbine 36. Operation of the latter is dependent upon a selective positioning of the propeller blades 38, the turbine and consequently the pump 34 being inoperative when these propeller blades are feathered.

Although a detailed description of the operation of applicant's refueling unit will be set forth below in connection with a discussion of FIG. 4, nevertheless it is thought that a short summary of a complete fuel-transferring cycle might be helpful in obtaining a basic understanding of the manner in which the various elements of the unit cooperate to produce the desired results. At this point, therefore, it might be said that prior to an actual fuel-transferring operation the propeller blades 38 are feathered so that hydraulic pump 34 is inoperative. Consequently, no primary power is developed in the unit 10. During this period, drogue 18 is fully retracted as illustrated in FIG. 3, the hose reel 28 being locked in position.

If the pilot of aircraft 12 now wishes to initiate a fuel-transferring cycle, he actuates a switch to release the propeller blades 38 from their feathered position. As soon as the hydraulic pump 34 begins operation, a source of fluid under pressure is developed within the closed system, and when this pressure reaches a certain level it unlocks the hose reel 28 and permits the drogue 18 to be spring-ejected from its housing. The drogue is immediately inflated by the pressure of air thereon, and extends rearwardly with the motor 30 acting to limit the extension speed until a predetermined position is reached, at which point the speed of the motor is reduced to bring the system to a halt.

The receiving aircraft 14 (which is provided with a fuel-receiving nozzle or probe) now makes contact with the drogue 18. A slight forward movement of the receiver aircraft relative to the supply aircraft produces a slack in hose 16 and causes a regulator valve to function to rotate the hose reel 28 to take up this slack. Such movement opens a fuel transfer valve and permits fuel to flow through the hose 16, assuming that the pilot of the supply aircraft has placed the system in condition for such action. The fact that fuel is being transferred is indicated to the receiver pilot. The elements retain this status until completion of the fuel-transferring step.

After all or a desired portion of the fuel in tank 22 has been transferred, the pilot of the receiver craft backs away from the drogue 18, the tanker pilot energizes the hose reel motor 30, and the hose 16 retracts and winds on reel 28 until the drogue 18 is again completely stowed in the position shown by FIG. 3. The propeller blades 38 feather, the reel 30 locks, and the entire unit 10 is de-energized.

Although the above description has very briefly set forth a cycle of operation by which fuel is transferred in accordance with the present disclosure, nevertheless a detailed discussion of each step in the cycle is believed to be desirable in order to bring out fully the unusual features of applicant's concept. For this reason, there has been shown in FIG. 4 a fluid flow chart and electrical wiring diagram illustrating the relationships and interconnections between each essential control element of the assembly illustrated in FIGS. 2 and 3, and a discussion of this figure will be related to the various steps by which fuel transfer is accomplished. All of the electrical controls and wiring carried by or within the support aircraft are grouped within the area defined by the broken line 40, while those contained wholly within the refueling unit or store 10 are grouped within the broken line 42. Interconnections between the electrical assemblies 40 and 42 are made through a detachable plug and socket 44 (FIGS. 2 and 3).

Drogue extension

To place the unit 10 in condition for the transfer of fuel, the tanker pilot moves master switch 46 to "on" position (upwardly in the drawing), the drogue control switch 48 being in "extend" position (as illustrated) both before and after a transfer cycle. This results in an energization of the turbine unfeathering solenoid 50, and also energizes the drogue-extending solenoid valve 52. With the propeller blades 38 now driving the turbine 36, hydraulic pump 34 beings to build up fluid pressure in the system, with the fluid flowing through the starting bypass valve 54 until the turbine reaches normal speed and the system pressure rises to a point at which the bypass valve closes. As the system fluid pressure thus builds up, cylinder 56 is activated to unlock the hose reel 28. This allows the springs 58 (FIG. 2) to eject the drogue 18 into the air stream. Air loads now acting on the drogue 18 cause the hose 16 to be played out to its maximum trail position. As the drogue ejects sequencing switches 60 and 62 are closed, and remain closed until the drogue 18 is again stowed in retracted position. Closure of switch 62 energizes the protective relay 64 which precludes inadvertent deenergization of the system until such time as the drogue is again stowed and switch 62 is opened.

As the hose 16 is reeled out, it reaches a point where only a small fraction of its total length remains on the reel 28. At this point, the level wind guide 66 contacts lever arm 68 to actuate the switches 70 and 72, the former being moved to closed position. This energizes the solenoid controlled relay 74 to deenergize the extend solenoid valve 52. Further extension of the hose 16 beyond this point (at which six feet of hose, for example, are left on the reel 28) mechanically overrides an automatic metering or pressure scheduler valve 76 through a linkage assembly 78 to increase the fluid pressure supplied to the reel motor 30 through valves 80, 82, and 84 to terminate movement of the reel 28. In addition, closing of the switch 70 and actuation of switch 72 closes the amber light circuit 86 at the rear of unit 10 and also actuates the solenoid 88 which is connected to the drogue position indicator in the pilot's compartment of aircraft 12. This indicates to both the tanker pilot and the receiver pilot that the drogue 18 is at its maximum trail position, and that the receiver craft may enter into engagement with the drogue.

The pressure scheduler 76 is a mechanically-actuated valve shown in detail in FIG. 8. It is operated by means of a lever arm 90 the outer end of which is pivotally connected to a bellows 92. The force of the latter in turn is determined by pressure differences produced in a Pitot tube installation 94. A difference in air pressure developed within the Pitot tube assembly produces a force on the bellows 92, which force is transmitted through the lever arm 90 to control the passage of fluid through the valve 76 by balancing the bellows force and the fluid pressure on hose reel motor 30. This has the effect of relating the fluid pressure on hose reel motor 30 to the air speed of the plane 12, thus producing a system in which an increase in air speed, for example, increases the reel motor pressure to eliminate the slack developed in hose 16 during engagement between the receiver aircraft and the drogue 18.

*Engagement of receiver aircraft with drogue*

Following contact between the drogue 18 and the probe projecting from the nose of the receiver aircraft 14, the pilot of the receiver aircraft shortens by a small amount the distance between his craft and that of the supply plane 12. This causes the hose 16 to partially reel in, thereby actuating switch 72 to the other of its closed positions. This results in an opening of the "extend" indicator circuit and a closing of the green light circuit 96 at the rear of the unit 10. The solenoid 98 is now energized, which produces an indication on the tanker instrument panel 100 that both craft are in such position that transfer of fuel may commence. Furthermore, the closing of the green light circuit 96 when switch 72 is actuated not only indicates to the receiver aircraft pilot that all elements of the system are in readiness for the transfer of fuel, but this action also arms the fuel transfer switch 48. Still further, the slight forward movement of the receiver aircraft just described causes the level wind guide 66 to move off the lever arm 68. The pressure scheduler 76 is now conditioned for automatic operation by the Pitot tube installation 94 through the bellows 92 to control the hydraulic pressure applied to the reel motor 30 through the hydraulic flow regulator valves 82 and 84 to maintain the tension in the hose 16 at some predetermined percentage of the drag load developed by the hose 16 and drogue 18 as a unit. In practice it has been found that hose tension should approximate 85% of drag load for optimum operation.

*Fuel transfer*

When the tanker pilot desires to start the transfer of fuel to the receiver aircraft, the switch 48 is moved to "transfer" position (downward in the drawing). This energizes solenoid 102 to open the fuel valve 104. Pressure scheduler 106 and valves 108 and 110 regulate hydraulic pressure to the fuel pump 32 as a function of hydraulic fluid flow in order to maintain a relatively constant fuel pressure at the drogue 18. A figure of 35 pounds of fuel pressure per square inch has produced satisfactory results. The quantity of fuel transferred is measured by means of a breaker contact 112 on the pump 32 (which as stated is of the positive displacement type) the former sending periodic impulses to a solenoid 114 associated with a counter 116 forming part of the console 100. It should be noted that this breaker contact 112 is armed only when the transfer circuit is energized, so that leakage of fuel through the pump 32 in its "no flow" condition is not registered on the counter 116.

If the receiver plane 14 backs off during the period of fuel transfer, hose 16 extends, level wind guide 66 actuates lever arm 68 to result in a closing of switch 72 in its other contacting position. This deenergizes the transfer circuit (including solenoid 102) and closes the transfer valve 104, shutting off fuel to the drogue 18.

*Drogue retraction*

When transfer of fuel has been completed, the pilot of the receiver plane breaks off contact between the probe on the nose of his aircraft and the drogue 18. The tanker pilot moves drogue control switch 48 to "retract" (upward) position, thereby energizing the retract valve solenoid 118. Fluid under pressure now passes through 118, the pressure scheduler 76, and valves 80, 82, and 84 to apply full system pressure to the reel motor 30. This flow of fluid from solenoid valve 118 overrides the action of the Pitot tube installation 94, so that air pressure on the drogue 18 during the hose-retracting interval is of no effect. When the hose 16 has been withdrawn to the last turn of the reel 28, the level wind guide 66 contacts a lever 120 to activate the flow-reducer valve 80. The latter is effective to slow the rotation of reel 28 from, say, 14 feet per second, to a speed of approximately two feet per second. This permits the drogue to enter its housing at a relatively slow speed, and, when it is fully retracted, the drogue centering collar 122 (FIG. 2) opens the switch 60 as schematically illustrated by the broken line 124 in FIG. 4 thereby cutting off power to the drogue position indicator on the console 100. The tanker pilot is now informed that the drogue 18 is stowed. Subsequent movement of master switch 46 to "off" position cuts off all control potentials to the unit 10 through the cable connection 44. Solenoid 50 is deenergized, the propeller blades 38 are feathered, and, as the fluid pressure in the system drops, the pin in cylinder 56 extends to lock the drogue in its fully retracted position.

In an emergency, the tanker pilot may dump the fuel contained in tank 22 by actuating master switch 46 to "dump" position (downward) thereby opening the fuel dump valve 126. To prevent inadvertent actuation of switch 46 to this position, some conventional form of protective guard (not shown) may be incorporated in the console 100, it being necessary to specifically remove this guard before the switch 46 can be operated for this purpose.

The amber and green lights 86 and 96, respectively, which are located on the rear section of the unit 10 so as to be visible to the pilot of the receiver aircraft 14, and which are energized in the manner above described, may be reduced in intensity for night operation by movement of the switch 128 to "dim" position (downward). This actuates relay 130, and places a series resistor in each of the light circuits.

FIG. 5 illustrates the internal construction of the valve 106 of FIG. 4. This valve receives fluid under pressure from the regulator valve 108 and acts, through variations in its piston position, to establish a pressure at the fuel pump 32 which is a function of hydraulic fluid flow, thus maintaining a predetermined fuel pressure at drogue 18 at all times when valve 104 is open.

FIG. 6 shows the design of the hydraulic flow reducer valve 80 of FIG. 4. It receives fluid from the pressure scheduler valve 76, and has an output connection which leads to the regulator valve 82. It is operated through a mechanical linkage extending to the lever arm 120, the latter being contacted by the level wind guide 66 when re-reeling of the hose 16 is nearly complete. When such contact occurs, the piston of valve 80 is displaced to reduce the flow of hydraulic fluid to the reel motor 30 and thus slow the speed of rotation of reel 28 to a point where the drogue 18 may enter its housing and assume the position shown in FIG. 3.

FIG. 7 brings out the internal construction of the solenoid-operated hose reel control valve 118 of FIG. 4. This valve 118 is identical in design to its companion hose reel control valve 52, and hence a single description will apply to both these devices. In the position illustrated, hydraulic fluid from the source under pressure is prevented from entering the valve due to the location of the piston. When the drogue-control switch 48 is actuated to "retract" position, the solenoid of valve 118 is energized to permit fluid to flow through the unit to the pressure scheduler valve 76, the hydraulic return outlet being closed as a function of this piston movement. Full system pressure is thus applied to valve 76.

FIG. 8 illustrates the operation of the pressure scheduler valve 76 of FIG. 4. Fluid selectively enters the valve (1) directly from the source under pressure, (2) from the hose reel control valve 52, and (3) from the hose reel control valve 118. The output of valve 76 is applied to the flow reducer valve 80. The instantaneous position of the piston of valve 76 is determined by movement of lever arm 90, the latter being connected both to the lever arm 68 through the linkage assembly 78, and to the bellows 92 which is operated by the Pitot tube arrangement 94. As the air speed of the craft 12 increases, pressure exterior of the bellows 92 likewise increases relative to the interior pressure. This increases the downward force on the lever arm 90 connected to the piston of valve 76, and hence raises the pressure of the hydraulic fluid applied to the reel motor 30 through valves 80, 82, and 84 to increase its braking effect on the drogue 18. Obviously a decrease in the air speed of craft 12 produces an opposite effect. As stated, however, this "automatic" operation of valve 76 may be overridden by contact between the level wind guide 66 and the lever arm 68, causing a downward movement of the lever arm 90 independently of the status of the Pitot system 94. Such action becomes necessary when it is desired to increase the hydraulic pressure applied to reel motor 30 to terminate rotation of reel 28 and hence stop the extension of drogue 18 at a predetermined point. Action of the Pitot tube assembly 94 may also be overridden when drogue-control switch 48 is actuated to "retract" position thus energizing the solenoid of valve 118. When hydraulic fluid from this valve 118 reaches valve 76, the piston thereof is forcefully depressed to permit fluid to flow from the source through valve 76 to valve 80 under full system pressure regardless of the prior position of lever arm 90. This renders the position of bellows 92 (as controlled by the Pitot tube assembly 94) immaterial at all times when valve 118 is open.

It has been found that the bypass valve 54 may in some cases be omitted, depending upon the size and effectiveness of the ram-air turbine 36. Still further, the fuel cut-off valve 104 may if desired be of the pressure-operated type, thus dispensing with the solenoid 102.

*Details of valve design and operation*

Valve 76 is the basic controlling valve for the reel 28. It can be seen by referring to FIG. 8 that this valve 76 consists of a spool or slide 76a located within a case in which there are five fluid ports 76b, 76c, 76d, 76e and 76f. Also connected to the slide 76a is an arm 90 which is operated on by the linkage from bellows 92 which tends to move the slide 76a down (with reference to FIG. 8) as a function of the pressure on the bellows. In operation, the valve 52 is placed in such a position as to allow pressure into the base of valve 76 through the port 76f forcing the slide 76a upward and closing off the primary passage 76c to the hydraulic flow reducer valve 80.

By thus closing off this primary passage 76c, fluid pressure or flow is prevented from operating through the valve into the passage 76c to the hydraulic flow reducer valve 80. Instead, however, with the slide 76a moved upwardly, the port 76d is opened which allows fluid to flow from valve 80, to pass through a small auxiliary conduit 76g in the valve 76 housing, and then to travel through the port 76d to the hydraulic return. As a result of this fluid flow the hose 16 will unreel, allowing the drogue 18 to trail out behind the tanker aircraft 12.

As the hose 16 reaches its full-travel position, the hose guide 66 engages the lever 68 which accomplishes the two following actions:

(1) It causes the electrical switching circuit to remove power from the valve 52, which places the valve 76 in its normal operating mode.

(2) It causes the arm 90 to move downwardly and open the internal porting of valve 76 such that fluid pressure may act on the reel drive motor 30 through the hydraulic flow reducer valve 80.

The drogue 18 will accordingly be stopped at its full-travel position.

Under normal operation of valve 76—that is to say, when the drogue 18 has been engaged by the receiver aircraft 14 and the latter has moved forward into fueling position, the valve 76 operates as a pressure-regulating valve in which the pressure acting on the hose reel 28 is balanced against the force applied by the bellows 92. As shown in FIG. 4, the Pitot system 94 applies a differential pressure across bellows 92, which in turn creates a force on the arm 90 in proportion to this differential pressure. Such force is applied through the arm 90 to the slide 76a, as shown in FIG. 8. With this slide in a fully-balanced position, both the hydraulic return port 76d and the port 76c to the flow-reducer valve 80 are closed. The pressure on the flow-reducer valve 80 is sensed through the small passage 76g in the valve body and acts on a small balance piston area 76h to oppose the bellows force. If the receiver aircraft 14 changes its position by moving forward, the tension of hose 16 will decrease, resulting in a corresponding decrease in the pressure required by the reel motor 30. This pressure is also felt on the small balance piston area 76h, and the force tending to raise the piston 76a will be decreased below the force applied by the bellows 92. The slide 76a will thus move down, opening the port 76c leading to valve 80 and allowing hydraulic pressure and flow to be applied to the motor 30 to build up the pressure such that the balance within valve 76 is restored. Should the receiver aircraft 14 back up, the pressure in valve 80 will be increased over normal by the action of the hose reel motor 30 acting as a pump. This will increase the pressure applied to the balance piston area 76h such that the slide 76a will move up and open the line 76d to the hydraulic return. Thus valve 76 operates to maintain a pressure in the line 76c leading to the flow reducer valve 80 that is directly proportional to the pressure differential exerted on bellows 92 by the Pitot unit 94.

In regard to the operation of valve 80, it can be seen by referring to FIG. 6 that the basic valve design consists of a slide 80a operating in a housing containing three ports 80b, 80c, and 80d. The primary ports consist of an inlet 80b from the pressure-scheduler valve 76 and an inlet 80c leading to the regulator valve 82. In addition there is a port 80d leading to the hydraulic return, the function of this latter port being merely to take care of internal leakage in the valve. Under normal operation, the slide 80a is positioned as shown in FIG. 6, allowing free flow between the two primary ports 80b and 80c. In the final phase of hose retraction, it is necessary to materially reduce the speed of hose travel. This is accomplished by shifting the valve slide 80a by means of a mechanical linkage to the lever arm 120 such that one of the primary ports 80b or 80c is closed internally. Fluid flow is thus caused to occur through an auxiliary orificed passage 80e as shown in FIG. 6. This reduction in passage area is such that the fluid flow is restricted to a small fraction of its normal rate, thus causing a reduction in the speed of hose travel to approximately 10 percent of the basic figure.

Valve 106 operates to maintain the pressure of the fuel at the drogue 18 at a relatively fixed value. The pumping system as shown consists of a fixed-displacement fuel pump 32 driven by a hydraulic motor 34 also of the fixed-displacement type. Through the gear ratio between the fuel pump and the drive motor, hydraulic fluid flow is caused to be a direct function of fuel flow, and the hydraulic pressure will be directly proportional to fuel pressure. As the fuel flow rate is increased through the hose 16, the pressure drop will vary as a function of the square of the flow rate. It is accordingly desirable to provide a control such that, with no flow in the hose 16, a fixed pressure is felt at the drogue 18, and, as the flow rate through the hose 16 is increased, the output pressure of pump 32 is likewise increased to make up for the pressure loss in the hose.

Valve 106 consists of a valve slide 106a encased in a valve body containing three fluid ports—a balance port 106b to the hydraulic return, an inlet port 106c which feels full hydraulic system pressure, and a regulated flow port 106d which leads to the fuel pump 32. The hydraulic return pressure, it will be noted, is maintained at a fixed value through operation of the differential pistons of the hydraulic reservoir (see FIG. 4), and is utilized to provide a fixed force which tends to move the slide 106a to the right as shown in FIG. 5. It will be also noted that full fluid pressure is tapped off the inlet port 106c of valve 106 and operates over the larger piston area at the left (in the drawing) of the valve assembly, thereby tending to force the slide 106a to the right. Fluid is conducted from the inlet port 106c through an orifice 106e into the main valve body. This orificed pressure passes through port 106d to the fuel pump 32. The pressure felt on the down-stream side of the outlet port 106d is fed back through internal passages (such as 106f) within the slide 106a to the balance area 106g of the small piston at the right of the valve assembly as shown in FIG. 5. In a condition of static operation, with hydraulic flow prevented because of the positive-displacement features of the pump 32 and motor 34, pressure will build up within the housing of valve 106 and will exert itself on the small balance area 106g at the right of the valve, thereby forcing the slide 106a to the left and closing the outlet port 106b.

Let it now be assumed that the receiver aircraft 14 has moved forward such that fuel flow is initiated. With fuel flow thus commencing, the pressure of the fuel will decrease, and this will be reflected by a drop in the hydraulic pressure input to the fuel pump drive motor 32. The outlet pressure of valve 106 will drop, the slide 106a will move to the right, and hydraulic flow will be allowed through valve 106 to the fuel pump drive motor 32. It should be noted that the pressure conduit into the valve 106 is orificed at 106e, and that, as a result, the internal pressure in the valve on the downstream side of this orifice 106e is less than the internal pressure in the valve on the upstream-side thereof, which incidentally acts on the large piston area at the left of the valve. This pressure differential is proportional to the square of the flow rate through the valve body. As this flow rate increases, therefore, the pressure required to balance the slide 106a through action on the balance piston at the right of the valve must increase as a function of the square of the flow rate through the valve. This is accomplished by motion of the slide 106a to the right, which decreases the amount of throttling of the outlet port 106b thus increasing the downstream pressure.

In regard to the relationship of the area of bellows 92 and the area of the valve piston 76a, it will be appreciated that these areas are chosen to result in a proper pressure acting upon the hose reel drive motor 30 in accordance with the particular airspeed, the drag force of the drogue 18, the diameter of the hose reel 28, and the hose reel gear ratio.

Obviously many modifications and variations of the present invention are possible in the light of the above teachings. It is therefore to be understood that within the scope of the appended claims the invention may be practiced otherwise than as specifically described.

I claim:
1. A self-contained refueling unit of generally symmetrical elongated configuration designed for detachable mounting on a supply aircraft for the purpose of refueling a receiver aircraft during flight, thus effectively converting said supply aircraft into a tanker during such operation, the receiver aircraft being provided with a forwardly-projecting fuel-receiving probe, said unit including a fuel supply tank, a fuel pump, a hose, a reel on which said hose is wound, the latter being connected at its inner end to receive fuel from said tank through said pump, a drogue connected to the outer end of said hose and normally stowed within said unit, said drogue being extended rearwardly from an opening in said unit located along the axis of symmetry thereof into position for engagement with the probe on said receiver aircraft upon selective rotation of said reel, a motor operatively connected to rotate said reel, a ram-air turbine mounted forwardly on said unit and selectively rendered operative during flight of said aircraft for supplying power to operate both said reel motor and said fuel pump, and means responsive to variations in airstream pressure produced by variations in aircraft speed during flight for operating said motor as a function of aircraft speed to thereby regulate its effective braking action and hence maintain said hose under approximately a predetermined degree of tension.

2. A self-contained refueling unit of generally symmetrical elongated configuration designed to be detachably carried by a supply aircraft for the purpose of refueling a receiver aircraft during flight, thus effectively converting said supply aircraft to a tanker during such operation, the receiver aircraft being provided with a forwardly-projecting fuel-receiving probe, said unit including a fuel supply tank, a hose, a reel on which said hose is wound, the latter being connected at its inner end to receive fuel from said tank, a drogue connected to the outer end of said hose and normally stowed within said unit, said drogue being extended rearwardly from an opening in said unit located along the axis of symmetry thereof into position for engagement with the probe on said receiver aircraft upon selective rotation of said reel, and a hydraulic motor operatively connected to rotate said reel, said motor acting selectively according to its direction of rotation to limit as a function of airstream pressure during flight the rate at which said hose extends prior to engagement between said drogue and the fuel-receiving probe of said receiver aircraft, as well as to retract said drogue into said unit following a subsequent disengagement with said probe, said unit further including a source of hydraulic fluid under pressure for energizing said hydraulic motor.

3. In-flight refueling apparatus mounted on an aircraft and comprising a hose; a reel upon which said hose is wound; a motor for driving said reel so as to effect selective extension and retraction of said hose, said motor acting both as a brake to limit the rate of extension of said hose from said reel and also to provide power for hose retraction; and hydraulic pressure-varying means effective following an extension of said hose into the airstream and including means responsive to variations in airstream pressure produced by variations in aircraft speed during flight for operating said motor as a function of aircraft speed to thereby regulate its braking action and hence maintain said hose under approximately a predetermined degree of tension.

4. In-flight refueling apparatus mounted on an aircraft and comprising a hose, a reel upon which said hose is wound, a hydraulic motor for driving said reel so as to effect selective extension and retraction of said hose, said motor acting both as a brake to limit the rate of extension of said hose from said reel and also to provide power for hose retraction, and means effective following extension of said hose into the airstream during flight for varying the hydraulic pressure applied to said motor as a function of aircraft speed to thereby regulate its braking action and hence maintain said hose under approximately a predetermined degree of tension, said hydraulic pressure-varying means including in combination a Pitot system, a bellows actuated by the pressure difference developed in said Pitot system during flight, means for determining the fluid pressure applied to said motor, and means responsive to the difference between the force from said pressure-determining means and the force produced on said bellows to develop a control variation effective to regulate the braking action of said motor.

References Cited in the file of this patent
UNITED STATES PATENTS

| | | |
|---|---|---|
| 1,848,372 | Moran | Mar. 8, 1932 |
| 2,382,412 | Grey et al. | Aug. 14, 1945 |
| 2,692,102 | Cobham et al | Oct. 19, 1954 |

(Other references on following page)

UNITED STATES PATENTS

| | | |
|---|---|---|
| 2,751,167 | Hopper et al. | June 19, 1956 |
| 2,774,547 | Latimer-Needham et al. | Dec. 18, 1956 |
| 2,823,881 | Patterson | Feb. 18, 1958 |
| 2,879,016 | Haase | Mar. 24, 1959 |
| 2,879,017 | Smith | Mar. 24, 1959 |

OTHER REFERENCES

Aviation Week Magazine (pages 53 and 55), Aug. 15, 1955.
Aviation Week Magazine (page 99), Dec. 10, 1956.
Aviation Week Magazine (page 34), July 8, 1957.